United States Patent Office 3,430,976
Patented Mar. 4, 1969

3,430,976
LEAF-SPRING SUSPENSION FOR AUTOMOBILE VEHICLES AND THE LIKE, ESPECIALLY FOR INDUSTRIAL VEHICLES
Jean Vautier, Lyon, France, assignor to Automobiles M. Berliet, Lyon, Rhone, France, a corporation of France
Filed May 24, 1966, Ser. No. 552,595
Claims priority, application France, May 25, 1965, 18,354
U.S. Cl. 280—124           2 Claims
Int. Cl. B60g *3/16, 3/28, 11/02*

ABSTRACT OF THE DISCLOSURE

A suspension for automobiles and like vehicles which prevents rotation of an axle about itself comprising a leaf spring pivotally fastened at its ends to brackets on the vehicle's chassis and having an axle fixedly mounted at substantially the center of the spring and a member mounted parallel to and vertically spaced from half of the leaf spring between the axle and one of the brackets. Half of the leaf spring, the parallel member, the axle, and one bracket form a quadrilateral which readily deforms when the axle is vertically displaced but which opposes pivotal movement of the axle about itself.

---

Figure 1:
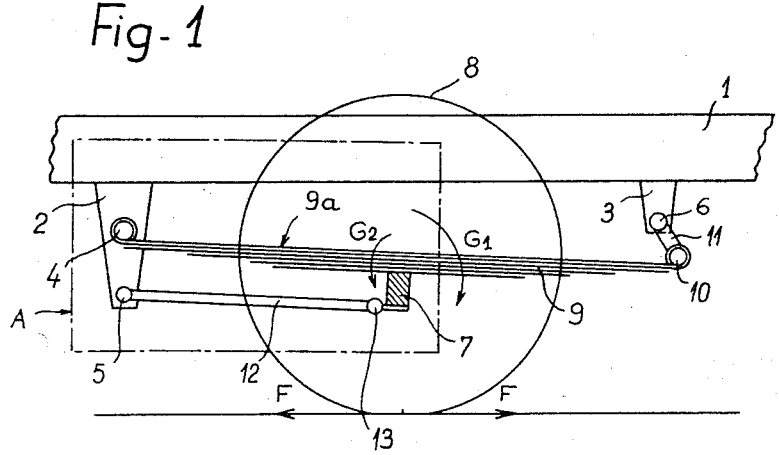

It is well known that the present tendency is to provide very flexible suspensions for automobiles or other vehicles in order to give improved comfort during travelling and to reduce the stresses due to shocks and vibrations applied to their constituent members.

Unfortunately, when a suspension is very flexible, it permits undesirable movement of certain parts of the vehicle. For example, a suspension having very flexible longitudinal leaf springs permits large pivotal movements of an axle, especially during braking and acceleration. These movements are particularly detrimental when the axle forms part of the steering, the pivotal movements modify excessively the so-called "castor angle" thus making driving of a vehicle suspended by a device of this kind more difficult.

The present invention is intended to overcome this drawback and to permit the provision of suspensions with very flexible longitudinal springs while at the same time preventing an axle, which is fixed to the suspension, from pivoting on itself through an excessive angle.

The present invention has for its object a suspension for automobiles or other vehicles, and especially for industrial vehicles, which is of the type comprising at least one leaf-spring arranged longitudinally with respect to the vehicle, pivotally mounted at one of its extremities on a support known as a "dumb-iron" rigidly fixed to the chassis or the body of the vehicle, and articulated at its other extremity on a lever commonly known as a shackle, pivotally mounted on the chassis or the body of the vehicle, and to the center of which is attached an axle which may be either a rigid axle such as those which are generally employed at the front of lorries, or a live axle. The suspension of this invention is characterized in that it comprises at least one member in the form of a crank-arm extending parallel to the spring and coupling the axle to the chassis or the body of the vehicle. The quadrilateral formed by this member, the axle, the part of the leaf-spring located between its pivot and this axle, and by the dumb-iron, being easily deformable during vertical oscillations of the axle but preventing the said axle from pivoting on itself.

The above specified deformable quadrilateral is preferably a parallelogram located in the vertical plane which contains the spring.

Figure 2:
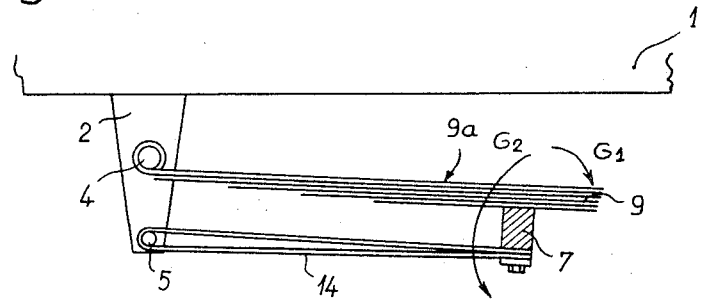
Figure 3:
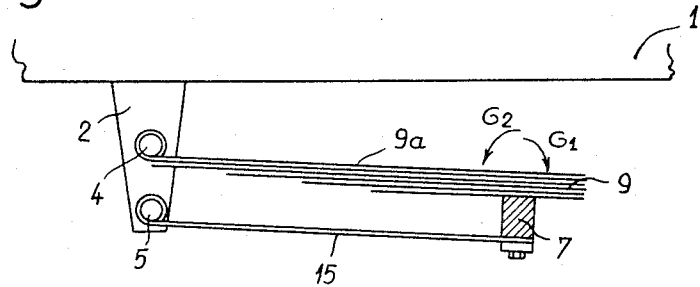

In order that the object of the invention may be better understood, three forms of embodiment will now be described by way of illustration, these embodiments being given as examples and shown in the accompanying drawings. In the drawings:

FIGURE 1 is a diagrammatic view in elevation of the first form of embodiment;
FIGURE 2 represents on a larger scale an alternative form of the detail A enclosed in chain-dotted lines in FIG. 1; and
FIGURE 3 shows another alternative form of the detail A to a larger scale.

Referring to FIGURE 1 of the drawings, it is seen that there has been designated by 1 a vehicle chassis, for an automobile or the like, this chassis being provided with two dumb-irons or brackets 2 and 3. These dump-irons are equipped respectively, the first with two shafts 4 and 5 located in the same vertical plane and the second with a single shaft 6.

Following a technique which is well known, an axle or a driving axle 7 provided with a wheel 8 is fixed for the purpose of suspension to a leaf-spring 9. The main leaf 9a of this spring is pivotally mounted at one of its extremities on the shaft 4, its other extremity being articulated by means of a shaft 10 on a shackle 11 pivotally mounted on the shaft 6 of the dumb-iron 3.

In accordance with the invention, a rigid crank-arm 12, pivotally mounted on the shaft 5 and articulated on the axle 7 by means of a shaft 13, couples the said axle to the dump-iron 2.

It will be noted that the crank-arm 12 is substantially parallel to the main left 9a of the spring 9.

The method of operation of the suspension thus formed is as follows:

When the axle 7 oscillates vertically, the crank-arm 12 does not hinder this movement. However, the axle 7 may also tend to pivot on itself in one of the directions indicated by the arrows $G_1$ and $G_2$ under the action of a force F created by the contact of the wheel 8 with the ground; this force F may be produced by the acceleration of the vehicle if the axle 7 is live, the axle in this case being a driving axle of the vehicle, or by the deceleration due to braking of this same vehicle if the axle is only a carrier axle. The crank-arm 12, put in compression or in tension by this force F, opposes the pivotal movement of the axle 7.

In the alternative form shown in FIG. 2, the chassis 1, the dumb-iron 2 and its shafts 4 and 5, the axle 7, the spring 9 and its main leaf 9a, are identical with those shown in FIG. 1, but the crank-arm 12 is replaced by an elastic blade 14 bent-back on itself round the shaft 5. The extremities of this blade are rigidly fixed to the axle 7.

When the axle 7 oscillates vertical'y, the blade 14, flexible in the transverse sense, practically does not interfere with this movement. Similarly, the axle 7 can rotate in the direction indicated by the arrow $G_1$, the shaft 5 then sliding between the two arms of the blade 14.

If on the contrary, the axle 7 rotates in the direction indicated by the arrow $G_2$, it puts the blade 14 under tension, the blade being retained by the shaft 5 which serves as a pivot and this blade opposes the movement of the axle 7.

FIG. 3 represents another alternative form of construction of FIG. 1. The chassis 1, the dumb-iron 2 and its shafts 4 and 5, the axle 7, the spring 9 and its main leaf 9a are identical with those shown in FIG. 1, but the member coupling the axle 7 to the chassis or the body 1 of the vehicle is constituted by an resilient blade 15, of which one of the extremities is pivotally mounted on the shaft 5, the other being rigidly fixed to the axle 7.

It will readily be understood that the resilient blade 15 practically does not hinder the oscillations of the axle 7, because of its vertical flexibility. Pivotal movement of the axle 7 on itself in the direction of the arrows $G_1$ and $G_2$ has on the contrary the effect of putting under longitudinal compression or tension the blade 15, which thus opposes any large pivotal movement of this axle.

It will of course be understood that the forms of embodiment described above do not have any limitative nature and may be given any desired modifications without thereby departing from the scope of the invention. By way of illustration of this observation, it should be noted that the shafts 4 and 5 are not necessarily arranged on the same vertical line and they may be displaced horizontally with respect to each other.

I claim:

1. A suspension for automobiles and like vehicles comprising a longitudinally disposed main leaf spring, one end of said leaf spring being directly pivotally connected to a first point on the suspended vehicle, shackle means pivotally connecting the other end of said leaf spring to a second point on the suspended vehicle, an axle fixedly fastened substantially at the center of said spring, a second leaf spring mounted substantially parallel to but vertically spaced from said main leaf spring, said second leaf spring being looped about a pivot on a third point on said suspended vehicle and with the free ends of said second leaf spring being fastened to said axle whereby rotation of said axle about itself is opposed in one direction only, said third point being vertically spaced from said first point.

2. A suspension for automobiles and like vehicles comprising first and second bracket means depending from the vehicle chassis, a longitudinally disposed main leaf spring, one end of said leaf spring being directly pivotal to said first bracket means, shackle means pivotally connecting the other end of said leaf spring to the second bracket means, an axle fixedly fastened substantially at the center of said main spring, a second resilient spring mounted substantially parallel to but vertically spaced from said main leaf spring, said second leaf spring being looped about a second pivot vertically spaced from said first pivot on said first bracket means and being fastened with its free ends to said axle whereby rotation of said axle about itself is opposed in one direction only.

References Cited

UNITED STATES PATENTS

| | | | |
|---|---|---|---|
| 3,194,580 | 7/1965 | Hamlet | 280—124 X |
| 2,753,007 | 7/1956 | Read | 280—124 X |
| 2,211,647 | 8/1940 | Collier | 267—38 |
| 1,557,237 | 10/1925 | Bobo | 267—45 |
| 432,840 | 7/1890 | Sample | 267—43 |

PHILIP GOODMAN, *Primary Examiner.*

U.S. Cl. X.R.

267—38, 54